June 13, 1950          H. D. BRAILSFORD          2,511,766
PHONOGRAPHIC PICKUP DEVICE
Filed March 10, 1949
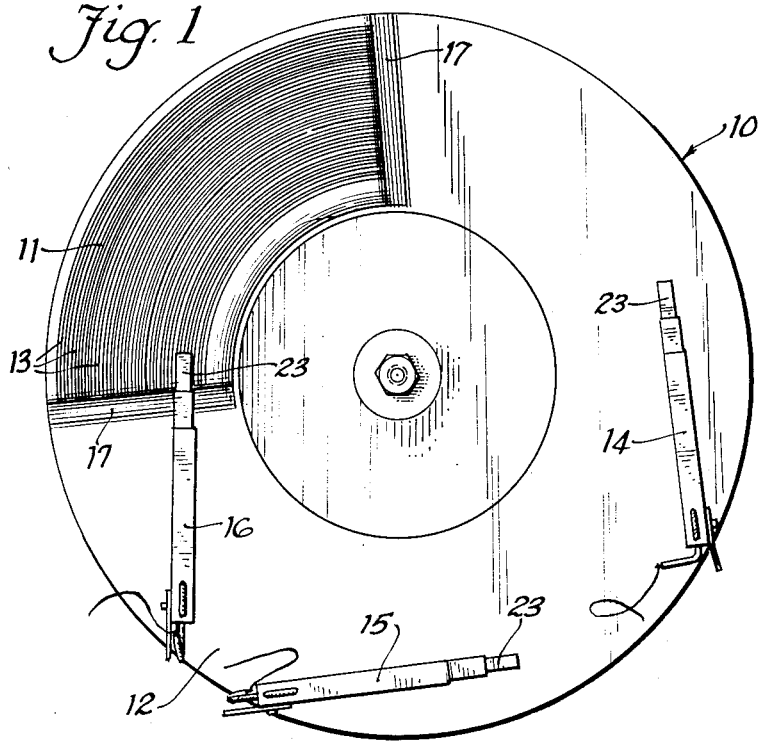
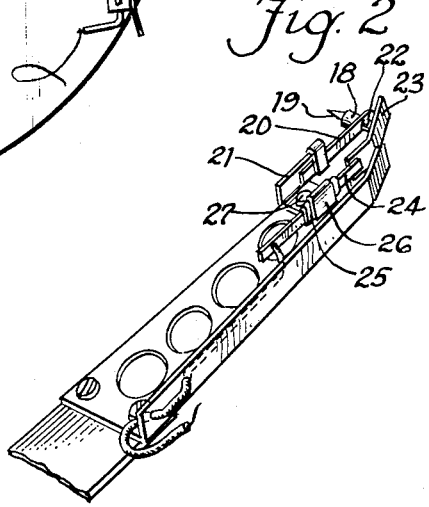
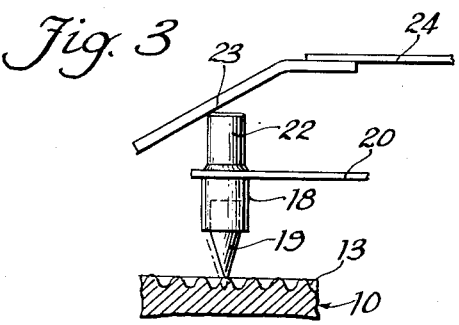
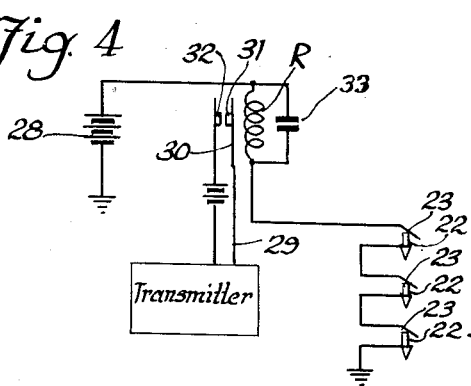
INVENTOR.
Harrison D. Brailsford
BY
Sheridan, Davis & Cargill
Attys Patented June 13, 1950

2,511,766

UNITED STATES PATENT OFFICE 2,511,766

PHONOGRAPHIC PICKUP DEVICE

Harrison D. Brailsford, Harrison, N. Y.

Application March 10, 1949, Serial No. 80,735

2 Claims. (Cl. 200—52)

This invention relates to improvements in phonographic pick-up devices of a type adapted for use in radiosonde apparatus.

In radiosondes of the type under consideration, wireless signals are transmitted to a receiver at a ground station, for example, as the radiosonde ascends or descends or passes through regions of varying meteorological conditions, the signals indicating when translated, the encountered conditions such as air pressure (altitude), temperature, and humidity, or any one or all of the same. The originating source of the signals of the radiosonde referred to is a phonograph type of record provided with concentric signal-bearing grooves or tracks, each of a distinctive wave form, and within any one of which a stylus of a pick-up device is adapted to operate for effecting the make and break of an electrical circuit for so modulating a carrier wave as to cause transmission of a signal or a repetition of a signal that is characteristic of the particular groove being traced by the pick-up. The receiving station attendant, by reference to data at hand, can identify the respective signal or signals received and translate them into terms of altitude, temperature, or humidity prevailing at the instant of transmission in the immediate vicinity of the radiosonde. Generally, such radiosondes are provided with three pick-ups supported by arms that move the respective pick-ups, when periodically disengaged from the grooves of the records, to positions for tracing particular grooves in response to meteorological conditions affecting the instruments, whereby signals are transmitted which give an indication of such conditions to the receiving station during operation of the radiosonde in flight.

The subject matter of the present application is disclosed in my co-pending application, Serial No. 570,190 filed December 28, 1944 for Radiosondes and I claim the priority of such application for the invention or inventions herein disclosed or claimed. Inasmuch as radiosondes of the type disclosed in said prior application are now known commercially, the detailed description hereinafter set forth will be limited to the improved pick-up devices and apparatus forming the subject matter of the accompanying claims and to such associated parts of the radiosonde as appear desirable in providing a clear understanding of the functioning of the claimed invention.

One object of the present invention is to provide a lightweight pick-up for use with radiosondes that is adapted to effect a make and break of an electrical circuit in a pattern that is characteristic of and identifies the signal-bearing groove that at any instant is being traced by the stylus of the pick-up.

Another object of the invention is the provision of a pickup of the make-and-break-contact type, the contacts of which are operative by the stylus actuated by phonographically recorded signals in the grooves of a phonograph-type record.

Since the improved pick-up effects a make and break of a circuit, it is another object of the invention to provide a pick-up having make and break contacts which break the circuit in response to undulations of the record groove which are of predetermined amplitude and representing recorded signals so that the contacts remain in circuit closing relation as the stylus of the pick-up traverses unmodulated portions of the groove notwithstanding such portions may normally be irregular and thus tend to effect separation of the contacts.

Other objects of the invention relate to various features of construction which will be apparent from the consideration of the following specification and accompanying drawings wherein:

Figure 1 is a side elevational view of a portion of a radiosonde of the type referred to above and illustrates a rotatable phonographic record provided with concentric grooves or tracks inscribed with identifying signal recordings or undulations and illustrating also three pick-up arms each provided with an improved pick-up device that is swingable by the respective arm to positions for tracing any of the tracks of the record;

Fig. 2 is a perspective view of a portion of a pick-up arm carrying an improved pick-up device and adapted to be moved by an instrument that is responsive to temperature or pressure or humidity affecting the device during periods when the respective pick-ups are not in engagement with a track;

Fig. 3 is an enlarged elevational view of parts of the pick-up device; and

Fig. 4 is a diagram of an electric circuit including three pick-ups of the type under consideration and associated transmitter apparatus.

As illustrated in Fig. 1 of the drawings, the obverse face of the record 10 therein shown has a portion or segment 11 disposed in a plane located forwardly of the plane of the remaining portion of the record which is indicated by numeral 12. The section 11 is provided with concentric grooves 13 therein, each groove being phonographically cut or otherwise formed to record therein a signal which when picked up by one of the pick-up members and electrically translated and transmitted by the transmitter will identify that particular groove. In other words, the phonographic recording of each groove is peculiar to that groove and a signal originating in a groove and picked up at a receiving station will indicate to the attendant at that station, by reference to data available, that one of the three pick-ups described has traced within that particular groove.

The segment 11 of the obverse face of the record shown in Figure 1 is in a plane to effect reproducing engagement with the pick-up members, and is located forwardly of the blank or uncut section 12 and hence as the record rotates clockwise in use as viewed in said figure, the three pick-up members indicated generally by the numerals 14, 15 and 16 will, in the order named, engage in three of the grooves 13 of the section 11 and thus effect the transmission in series of three signals, each of which upon being received by a receiving station will identify the three grooves at which the respective signals originated. The angular length of the section 11 is shown as approximately 87 degrees and the angular spacing of the styli of the pick-ups is within a range of approximately 180 degrees. The angular length of the section 12 is approximately 270 degrees, there being a few degrees of arc in the transition inclines 17 between the ends of the section 11 and the adjacent portions of the section 12. During the rotation of the record clockwise as viewed in Figure 1, the stylus of pick-up of arm 14 will first engage within a groove 13 of section 11 and as the section 11 passes beyond the stylus of that pick-up, the stylus of pick-up of arm 15 will engage in a groove 13 and as that groove passes beyond the stylus of the pick-up of arm 15, the stylus of pick-up of arm 16 will engage in a record groove. As the section 11 moves beyond the stylus of pick-up of arm 16, all three pick-ups will be opposite portions of the blank section 12, the face of which is spaced out of contact with said styli. Hence, as the record rotates clockwise from approximately the position shown in Figure 1 until the advancing end of section 11 again comes into contact with the stylus of the pick-up of arm 14 no signal will be transmitted. Such gap or interval between the signal originating at the pick-up of arm 16 and the succeeding signal originating at the pick-up of arm 14 separates the successive three-signal series. Hence it is known by the attendant at the ground or other signal receiving station that the first signal following the gap or interval referred to originates at the pick-up of arm 14 which indicates altitude or air pressure. The second signal in that particular series will be known by the attendant to originate from pick-up of arm 15 and hence will indicate temperature, while the third signal of the series will be known to originate from pick-up of arm 16 and will indicate humidity. The record shown is operated by a motor of any suitable design, but not pertinent to the present invention.

During the non-signalling intervals, that is when the pick-ups or any one of the same is over the blank section 12 of the record, the styli of the pick-ups or of any one of the pick-ups adjacent section 12 is free of the record, and hence can be swung arcuately by the respective condition-responsive device, that is, pressure, temperature and humidity responsive instruments, not shown, whereby the stylus of the respective pick-up will engage within a different groove 13 during the succeeding signalling cycle, if the respective meteorological conditions have altered since the preceding cycle, to thereby indicate such change in condition.

The pick-up arms 14, 15 and 16 may be identical and are provided with similar pick-up devices. In Figure 2 arm 14 is shown in detail. The pick-up means therein shown comprises a stylus indicated generally by the numeral 18 having a needle point 19 adapted to track within the grooves of the record and follow or vibrate in response to the signals recorded therein. The stylus 18 is shown mounted on a spring 20 secured to an adjustable bracket 21 which is attached to the arm or pick-up member 14. The spring 20 and the bracket 21 are of electrically conductive material and form a portion of a circuit, shown diagrammatically in Fig. 4, of which the arm 14 also is a part. The spring 20 carries an electrical contact member 22 in engagement normally with which is a contact 23 which is mounted on a spring 24 supported by, but insulated at 25 from a bracket 26 which may be formed as a part of the bracket 21 and secured to the arm 14 by a rivet 27 or the like.

The spring 20 exerts sufficient force on the stylus 18 to retain the needle point 19 constantly in contact with the surface of the undulations of a track while the track portion 11 of the record moves past the respective pick-up. The spring 24 urges the contact 23 in a direction normally to retain the latter in electrical contact with contact member 22, but the relation of the force exerted by the spring 24 to the weight of contact 23 is such that separation of the contacts 22 and 23 occurs during the tracking of a signal-bearing groove by the stylus 19 to effect the transmission of the signal of the particular groove. It will be understood that the pick-up means is not intended to reproduce the exact wave form of the signal-bearing groove, but rather is intended to effect modulation of an electrical circuit in response to the recordings of the track. In utilizing the present improved pick-up mechanism, it is desirable that the stylus 18 be of low mass and so related to the force exerted thereon by the spring 20 that the needle point 19 will remain in contact with the engraved or recorded track of the record. As the record rotates, the undulations or wave form of the signal-bearing track effect reciprocation of the stylus (see Fig. 3) and as the needle point 19 approaches the crest of a particular engraved or recorded wave form, the acceleration imparted to the stylus 18 will be such that the contact 23, due to its greater mass, will move away from or out of contact with the contact 22 and thus effect interruption of a circuit of which contacts 22 and 23 are a part.

To effect the desired result spring 20 must exert a force, to the left as viewed in Figure 2, that is equal to or greater than the product of the mass of the stylus times the peak acceleration imparted to the latter by the undulations of the track. Where such relations obtain, that is where $F \geqq Ma$, the needle point 19 will remain in contact with the record track throughout the length of the latter.

Since the acceleration of the contact 23 is imparted thereto by the record induced vibrations of the stylus, if the relation of the force of spring 24 to the product of the mass of the contact 23 times its acceleration were similar to that obtaining in the other spring structure, the contact 23 would remain in contact with contact 22.

A different relation therefore, must obtain as between the spring 24 and the contact 23, namely, the force exerted by the spring 24 on the contact 23 must be less than the product of the mass of the contact 23 times the peak acceleration imparted to said contact by the stylus. In other words, the relation of the strength of spring 24 to the weight of the contact 23 must be $F<Ma$, where F is the force exerted by the spring 24 on the contact 23, M is the mass of the latter and $a$ is the peak acceleration imparted thereto by the stylus.

Where the values referred to prevail the stylus point 19 will always remain in contact with the undulations of a signal-bearing track and the contact 23 will separate from the contact 22 intermittently, according to a pattern predetermined by the actuating recording for effecting separation of the two contacts and thereby alternatingly making and breaking the contact circuit. The pattern of separation of the contacts is characterized by the record undulations and thus effects the transmission of signals of a character predetermined by the particular signal-bearing track that effects the reciprocation of the stylus 18 at the instant of transmission.

A suitable radiosonde circuit including a wireless transmitter and also the three pairs of pick-up contacts is shown in Fig. 4.

With the three sets of contacts 22, 23 of the three pick-ups in closed relation current flows from the current source 28 through a relay winding R to energize the same and thereby, against the action of spring 29, move the relay armature 30 to effect separation of contacts 31 and 32. The current flows from the winding through the contacts 22, 23 of the arms 14, 15 and 16 and to the ground. The repeated separations of three pairs of contacts 22, 23 effects a keying of the transmitting circuit whereby the carrier wave is intermittently interrupted, or modulated.

A condenser 33 cooperates with the effective pick-up contacts 22, 23 in the circuit illustrated in Fig. 4 to cause the energization and de-energization of the relay coil R at a speed or rate determined by the recording actuating the effective pick-up. The speed or rate of energization and de-energization of the relay coil in the illustrated circuit preferably is less than the frequency of the recording actuating the effective pick-up. Upon each de-energization of the relay coil, the relay contacts are closed. The keying of the transmitter circuit so effected by the relay contacts as just described is of advantage not only in that the signals may be transmitted in conventional International Morse or other dot and dash code but relatively simple and inexpensive receivers may be employed in receiving the signals at a receiving station while the range of transmission of receivable signals, for a given apparatus, is greater also as compared with a system wherein audio or other forms of frequency modulation is employed. Keying the transmitter, as described therefore, is preferred but it will be obvious that such mode of modulation is not essential to the attainment of the numerous advantages of the present improvements.

I claim:

1. A phonographic pick-up comprising a contact, a supporting stylus for the contact adapted to trace signal-bearing grooves of a record, resilient means on which the stylus is mounted for retaining the latter in activatable engagement with a groove whereby the supported contact moves in conformity with the wave form of the groove, and a second contact provided with a spring mounting tending to retain the second contact in circuit closing relation with respect to said first contact and having a mass sufficiently great in relation to the force exerted thereon by said spring mounting that said second contact intermittently moves to circuit opening relation with respect to said first contact under the acceleration imparted thereto by said first contact in moving in conformity with the wave form of a groove.

2. A phonographic pick-up device comprising a pick-up arm, a stylus adapted to trace a signal bearing groove of a record, said stylus having a contact thereon, resilient means mounting said stylus on the pick-up arm and exerting pressure on the stylus in a direction to cause the stylus to remain in engagement with and to vibrate in response to the undulations of the groove, a second contact in closed relationship with said first contact, a second resilient means exerting pressure against the second contact in a direction tending to retain the contacts in circuit closing relation, the pressure exerted by said second resilient means being less than the product of the mass of the first contact times the peak acceleration imparted thereto by the first contact as it vibrates in response to the undulation of the groove whereby at the instants of said peak acceleration the second contact will move by inertia out of circuit closing relation with the first contact for opening a circuit including said contacts.

HARRISON D. BRAILSFORD.

REFERENCES CITED

The following references are of record in the file of this patent:

UNITED STATES PATENTS

| Number | Name | Date |
| --- | --- | --- |
| 508,050 | Richardson | May 7, 1893 |
| 1,090,816 | Henschel | Mar. 17, 1914 |
| 1,099,093 | Kent | June 2, 1914 |
| 1,306,829 | Mellinger | June 17, 1919 |
| 1,630,359 | Scott | Mar. 31, 1927 |
| 1,837,140 | Thew | Dec. 15, 1931 |
| 2,066,538 | Phelps | Jan. 5, 1937 |